United States Patent Office.

REUBEN A. ADAMS, OF CAMBRIDGE, MASSACHUSETTS.

Letters Patent No. 95,179, dated September 28, 1869.

IMPROVEMENT IN PRESERVING FISH.

The Schedule referred to in these Letters Patent and making part of the same.

*To all whom it may concern:*

Be it known that I, REUBEN A. ADAMS, of Cambridge, in the county of Middlesex, and State of Massachusetts, have invented a new and useful Improvement in the Mode of Curing and Preserving Fish; and I do hereby declare the following to be a full, clear, and exact description and explanation of my improved process.

My improvement consists in impregnating the fish to be preserved, during the process of curing, of which it forms a part, with a solution of saltpetre and alum, applied in such a manner and in such proportions as will be more fully described hereafter.

To enable those skilled in curing and packing fish for the market to practise my invention, I will now proceed to explain my improved process in detail.

My improvement is an additional or supplementary process, and may be applied to advantage in connection with any of the known modes of curing fish, or after the fish have been cured by either of the now known processes.

In applying my improved process, I take the fish, either before or after they have been salted, and place them in a bath or solution of saltpetre and alum, in the following proportions, which I deem the best for general purposes, viz, five pounds of saltpetre and four ounces of alum to sixty gallons of sea-water, putting in as many of the fish as the solution will completely cover, and letting them remain about four hours, when I remove them from the solution, and dry them, either in the sun or by artificial means, as may be preferred.

The above proportions may be varied to suit circumstances; as, for instance, if the fish are to be kept a long time, the solution may be made stronger, or if it is desirable to prepare an article more nearly resembling fresh fish, and not intended to be kept for a great length of time, the salting-process may be dispensed with, and the fish may be put into my solution immediately after being taken from the water and cleaned, and after being taken from the bath, they are dried in the usual manner.

It is well known that the greatest defect heretofore encountered in the preservation of fish has been the sweating, and final decay, when exposed to a damp atmosphere, or packed in tight boxes, all of which may be directly traced to the presence of certain unnutritious portions of the fish, such as the bones, skin, and the mucous membrane between the skin and the flesh, all of which must be removed in order to successful preservation by either of the known processes, which, of course, it is desirable to do to a certain extent, in order to reduce the bulk of the prepared article; but I have found, by experiment, that it is very difficult, to say the least, to remove all the useless or deleterious substance by merely dissecting the fish, and using only common salt. I have also found that impregnating the fish with a solution of saltpetre and alum, as stated above, will have the effect to destroy the tendency to sweating and decay, even though the useless portions may not all be removed, and thereby cause the fish to keep sweet a long time, and greatly protects it from the effects of a change of climate, while it imparts a more agreeable flavor to the fish.

I am aware that fish have been salted and afterward skinned and cleaned; in fact, most salted fish is so treated before being prepared for food.

I, therefore, do not claim any particular mode of operating previous to or after subjecting the fish to a bath in my solution; but

What I claim as my invention, and desire to secure by Letters Patent, is—

The use of saltpetre and alum in the process of curing fish, in the manner and for the purposes substantially as described.

Executed at Boston, this    day of July, 1869.

REUBEN A. ADAMS.

Witnesses:
THOS. HOLMES,
N. C. LOMBARD.